United States Patent [19]
Kim et al.

[11] Patent Number: 5,732,085
[45] Date of Patent: Mar. 24, 1998

[54] FIXED LENGTH PACKET SWITCHING APPARATUS USING MULTIPLEXERS AND DEMULTIPLEXERS

[75] Inventors: Kyeong Soo Kim; Hyup Jong Kim; Keun Bae Kim; Jeong Jin Lee, all of Yuseong-ku, Rep. of Korea

[73] Assignees: Electronics and Telecommunications Research Institute, Daejeon; Korea Telecommunication Authority, Seoul, both of Rep. of Korea

[21] Appl. No.: 573,093

[22] Filed: Dec. 15, 1995

[30] Foreign Application Priority Data

Dec. 16, 1994 [KR] Rep. of Korea ............. 1994-34756

[51] Int. Cl.$^6$ ................. H04J 3/26; H04L 12/56
[52] U.S. Cl. ............ 370/398; 370/395; 370/413; 370/218
[58] Field of Search ................. 370/351, 389, 370/390, 395, 398, 399, 410, 411, 412, 413, 414, 419, 422, 426, 428, 429, 535, 537, 538, 542, 216, 217, 218, 219, 220, 229, 250, 352, 355, 396, 397; 340/825.03, 825.16, 826, 827

[56] References Cited

U.S. PATENT DOCUMENTS

| | | | |
|---|---|---|---|
| 4,400,627 | 8/1983 | Zola | 370/351 |
| 4,754,451 | 6/1988 | Eng et al. | |
| 4,811,333 | 3/1989 | Rees | 370/217 |
| 4,879,712 | 11/1989 | Littlewood | 370/218 |
| 5,285,445 | 2/1994 | Lehnert et al. | 370/413 |
| 5,557,621 | 9/1996 | Nakano et al. | 370/395 |

OTHER PUBLICATIONS

"The Cylinder Switch: An Architecture for a Manageable VLSI Giga–Cell Switch" Benjamin Monderer, Giovanni Pacifici and Charles Zukowski, Jul. 3, 1989, CTR Technical Report, pp. 1–14.

"Experimental Broadband ATM Switching System", Yuji Kato, Toshio Shimoe, Kazuo Hajikano and Koso Murakami, Fujitsu Laboratories, LTD., Kawasaki, Japan, 1988, IEEE. Global Com '88, pp. 184–188.

"The Knockout Switch: A Simple, Modular Architecture for High–Performance Packet Switching", Yu–Shuan Yeh, Michael G. Hluchyj and Anthony S. Acampora, IEEE. Journal on selected Areas in Communications, vol. SAC–5, No. 8, Oct. 1987, pp. 274–283.

*Primary Examiner*—Wellington Chin
*Assistant Examiner*—Huy D. Vu
*Attorney, Agent, or Firm*—Jacobson, Price, Holman & Stern, PLLC

[57] ABSTRACT

The present invention relates to a fixed length packet switching apparatus using multiplexers and demultiplexers in which the apparatus has an output buffer-type construction, protects itself from a temporary overflow occurrence of an output terminal and has the construction of the mutual flow control to enhance its entire performance. The present invention can protect the entire operations as well as enhance the entire performance of the switching apparatus by preventing an obstacle of the switching apparatus due to an overflow temporarily generated from an output terminal, process without a loss of excessive cells a traffic phenomenon of one output port in the switching apparatus, reduce the necessary buffer according to the effect of the rate gain and process smoothly input traffic of the internal buffer having a burst characteristic. Further more, the present invention has a duplicate function of cells able to provide a broadcast-type service distributed to subscribers at one time so that the subscribers can receive a distributed service to thereby increase the effectiveness of the channel.

3 Claims, 7 Drawing Sheets

FIXED LENGTH PACKET SWITCHING APPARATUS USING MULTIPLEXERS AND DEMULTIPLEXERS

BACKGROUND OF THE INVENTION

1. Field of the Invention

The present invention relates to a fixed length packet switching apparatus, and more particularly to a fixed length packet switching apparatus using multiplexers and demultiplexers for a private network and a broadband integrated services digital network capable of giving a chance for a signal transmission to an input signal having a higher generation rate in probability.

2. Description of the Prior Art

With the development of communication techniques, users demand more varied and better services. Such user demand causes a broadband integrated services digital network (B-ISDN) of an ATM system to be developed for providing a continuity-characteristic service, such as a voice service, a high speed data service, such as a file transmission, a burst-characteristic service, such as a VBR (Variable Bit Rate) real time image service, and so on, on the same transmission link. This situation asks for a fixed length packet switching apparatus suitable for a B-ISDN ATM system rather than a TDM system based on a conventional STM system as a mutiplexing and switching processor which is a main component of a telecommunication system.

Figure 1:
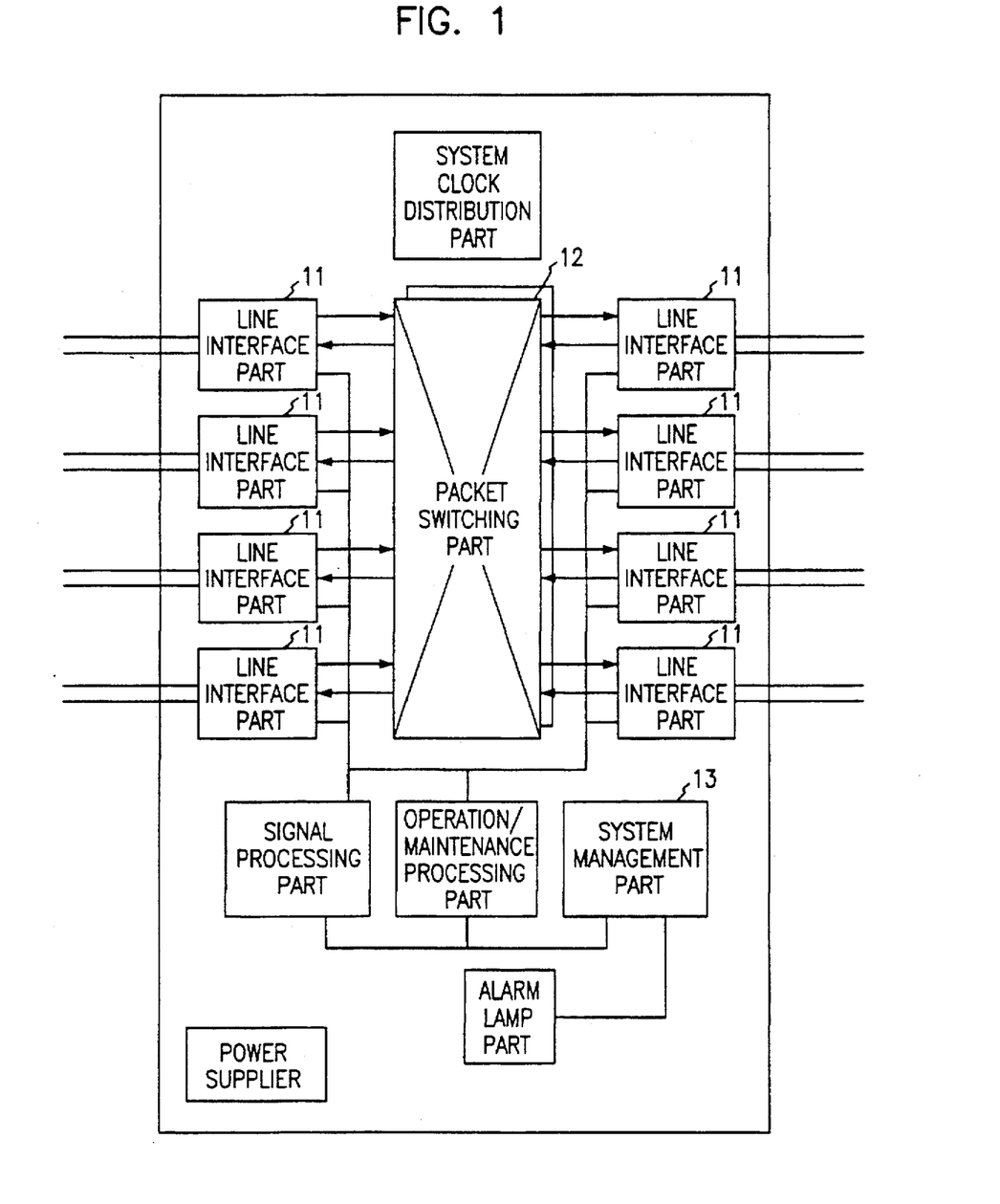
FIG. 1 is a block diagram showing a general packet switching apparatus.

FIG. 1 is a block diagram showing a general switching apparatus, according to the above demand. The general switching apparatus is divided into a ramified line interface part 11, a packet switching part 12, for a main function, a system management part 13, and another I/O part. The line interface part 11 matches transmission frames and outputs a target position information (a routing tag) on a packet to the packet switching part 12 through a table manager, which has connection identifiers and information associated with the connection identifiers, after clock and packet reconstructions of an inputted signals. According to this, the packet switching part 12 uses the target position information to route the packet to a corresponding target position, converts a channel identifier of packet data transmitted from the line interface part 11 and transmits the converted channel identifier as a completion of the packet switching. The packet switching requires a point-to-point switching as well as a point-to-multipoint switching as a packet duplicate function able to provide a broadcast-type service.

Figure 2:
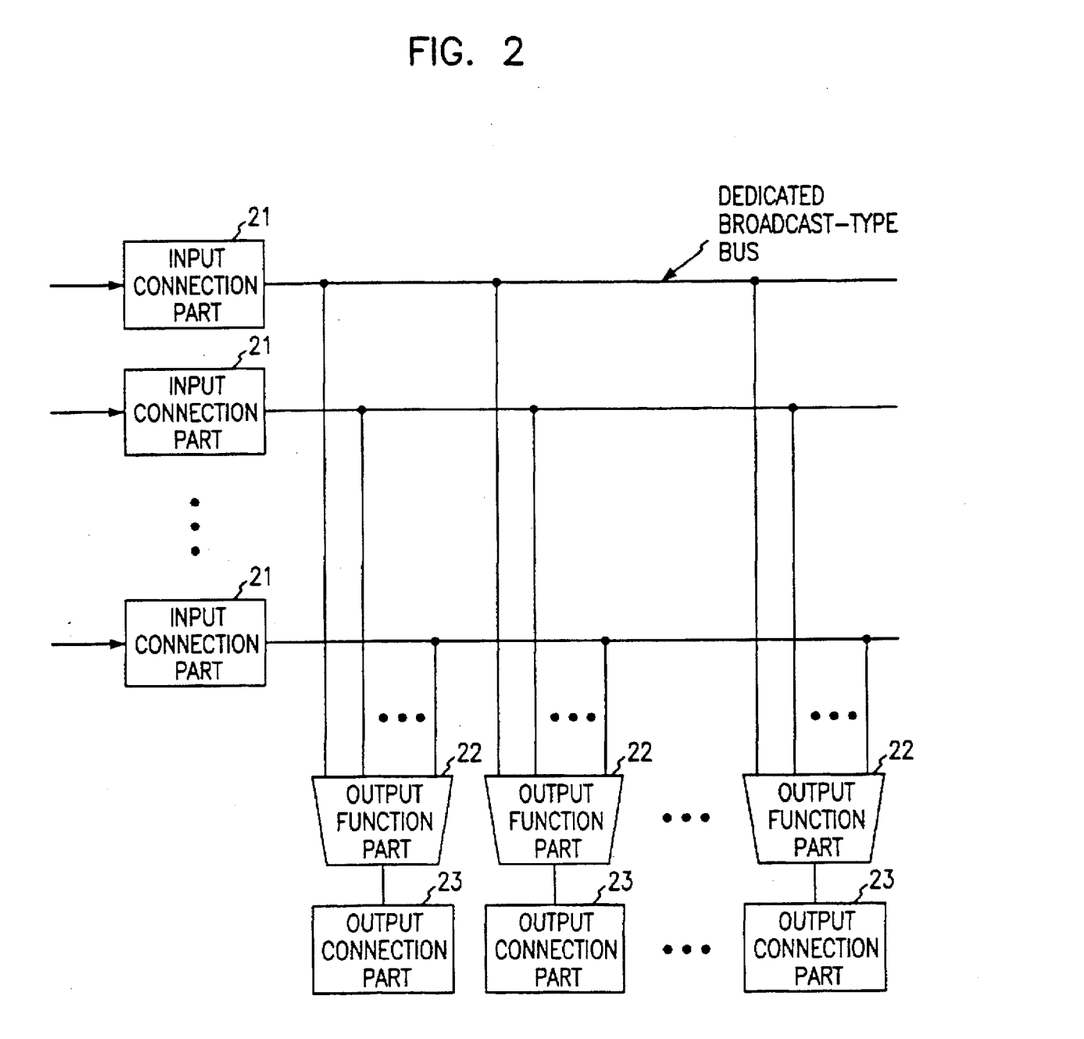
FIG. 2 is a block diagram showing an output buffer-type packet switching apparatus having a dedicated broadcast-type bus as an embodiment of FIG. 1.

FIG. 2 is a block diagram showing an output buffer-type packet switching apparatus using a dedicated broadcast-type bus as an embodiment of the switching apparatus of FIG. 1. As shown in FIG. 2, input connection parts 21 are connected to output function parts 22 through the dedicated broadcast-type bus. Each of the output function parts 22 are connected to each of the output connection parts 22 in a one-to-one manner. Here, in case the number of the input connection parts 21 in the switching apparatus is N, each of the output function parts 22 includes a multiplexer having N input terminals and an output terminal, and each of the output function parts 22 inputs N ATM information cells at maximum in one time and outputs the cells one by one according to an internal service system. Further more, each of the output function parts 22 compares an inherent address of an output function part matched therewith with a target point address of an information cell inputted through the dedicated broadcast-type bus, receives the information cell when the two addresses are the same and discards the information cell when the two addresses are not the same. A packet switching apparatus having this construction can be found in a switching apparatus using a knockout concentrator (U.S. Pat. No. 4,754,451) or a switching apparatus using a two-step buffering method and a velocity gain method.

The switching apparatus having this construction has the advantage of easy construction as well as a disadvantage of flow control impossibility when a temporary overflow occurs in an output terminal.

SUMMARY OF THE INVENTION

Accordingly, it is an object of the present invention to provide a fixed length packet switching apparatus using multiplexers and demultiplexers in which the apparatus has an output buffer-type construction, protect itself from a temporary overflow occurrence of an output terminal and has a construction of a mutual flow control to enhance its entire performance.

It is another object of the present invention to provide a fixed length packet switching apparatus using multiplexers and demultiplexers in which an interconnection of input function parts and output function parts are provided by a connection of the mutiplexers and demultiplexers, and switching operations can be performed in any input packet flow in an entire asynchronization between the multiplexers and the demultiplexers.

It is further an object of the present invention to provide a fixed length packet switching apparatus using multiplexers and demultiplexers in which the apparatus has a packet duplicate function able to support a point-to-point connection as well as a point-to-multipoint connection.

In order to accomplish the above objects, in a switching apparatus having a plurality of line interface parts and a system management part, the present invention comprises a switching part having a plurality of input port driving units (IPDU) for inputting a packet target point information signal (a routing tag), a connection identifier signal and a receiving clock signal in synchronization with a transmission frame inputted through the plurality of line interface parts, performing a noise removal and a buffering functions of the signals and performing a connection function between adjacent units; a plurality of switch input demultiplexer units (SIDU) for inputting continued packets constituted with data corresponding to a packet flow and a packet flow-related control signal from the IPDU, judging the selecting or non-selecting of the packets, temporarily storing the packets, demultiplexing and duplicating the packets for routing according to the target point information signal and performing a temporary store function of the packets when an overflow occurs on a specific input link; a plurality of switching output multiplexer units (SOMU) for inputting and collecting in an output buffer each of the packets routed through input links mutually and fully connected with each of SIDU, and multiplexing the collected packets for outputs as a packet flow; a plurality of output port driving units (OPDU) for outputting the packet flow of the SOMU to each of the line interface parts; a switch module control unit (SMCU) for controlling each of SOMU, checking the state of SOMU, and reporting the state of SOMU to a management processor; a switch change-over control unit (SCCU) for performing a change-over function to substitute an error occurrence switch according to the state reporting of SMCU; a system clock distribution unit (SCDU) for inputting a system clock from external and outputting the system clock to each of the units constructing the switching apparatus; a processor interface control unit (PICU) for interfacing the switching apparatus and a processor; and a reset control unit (RSCU) for initializing the switching apparatus.

DETAILED DESCRIPTION OF THE INVENTION

Hereinafter, an embodiment of the present invention will be described in detail with reference to the attached drawings.

Figure 3:
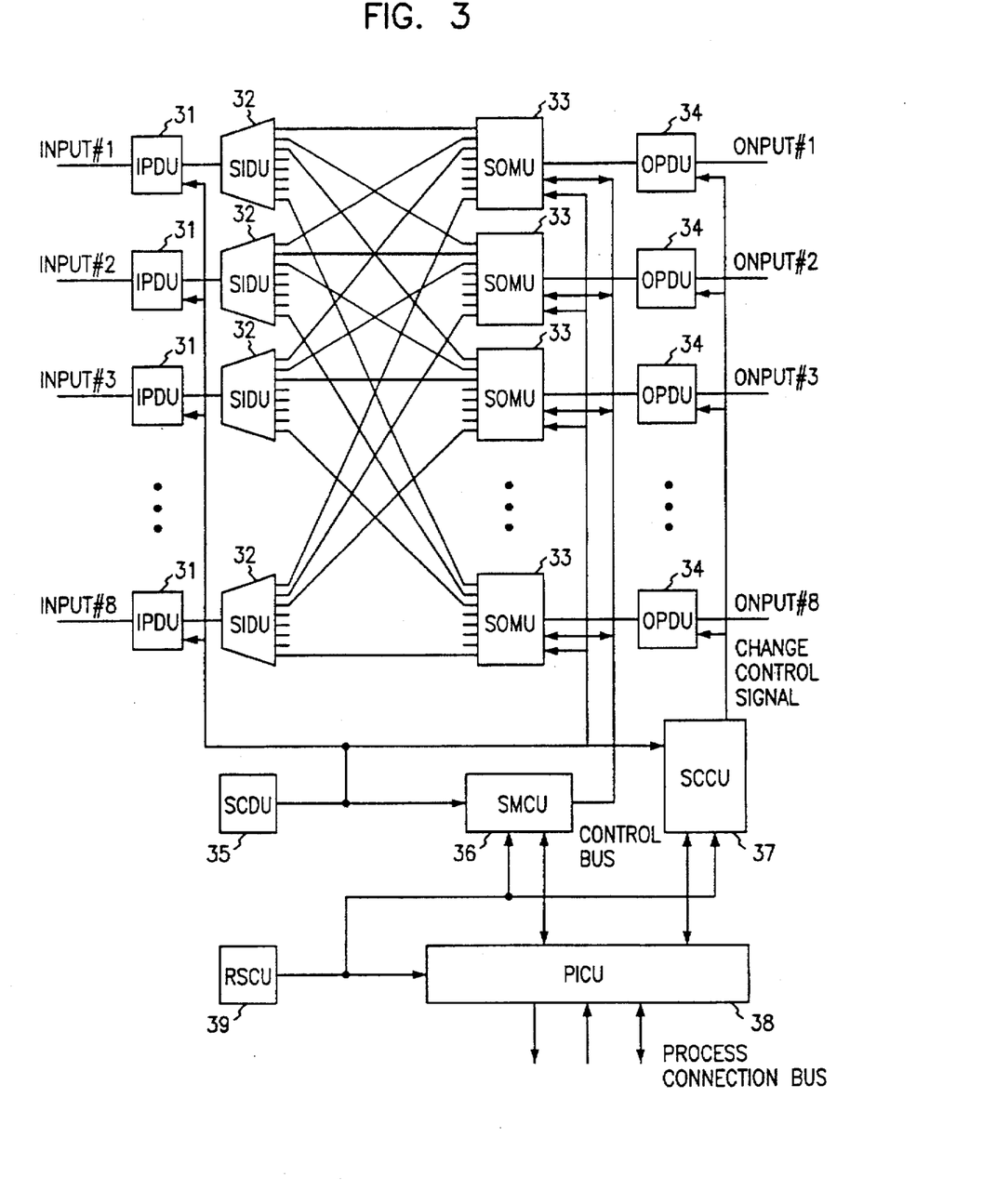
FIG. 3 is a block diagram showing a switching apparatus according to an embodiment of the present invention.

The present invention has a basic construction as shown in FIG. 1 and a packet switching part has a detailed construction as shown in FIG. 3.

FIG. 3 is a block diagram for showing a switching apparatus according to an embodiment of the present invention, wherein 8 input/output ports are shown. A plurality of input port driving units (IPDU) 31 input a packet target point information signal (a routing tag), a connection identifier signal and a receiving clock signal in synchronization with a transmission frame inputted through the plurality of line interface parts, perform noise removal and buffering functions of the signals and perform a connection function between adjacent units. A plurality of switch input demultiplexer units (SIDU) 32 input continued packets constituted with data corresponding to a packet flow and a packet flow-related control signal from the IPDU 31, judge the selecting or non-selecting of the packets, temporarily store the packets, demultiplex and duplicate the packets for routing according to the target point information signal and perform a temporary store function of the packets when an overflow occurs on a specific input link which is mutually and fully connected with arbitrary switching output multiplexer units (SOMU) 33. The SOMU 33 input and collect in an output buffer each of the packets routed through the input links mutually and fully connected with each of the SIDU 32, and multiplexing the collected packets for outputs as a packet flow. A plurality of output port driving units (OPDU) 34 output the switched packet flow to each of the line interface parts, the switch module control unit (SMCU) 36 controls each of the SOMU 33, check the state of the SOMU 33, and report the state to the management processor. Further more, a switch change-over control unit (SCCU) 37 performs a change-over function for replacing a switch on an occurrence of a switching function error, according to the state reporting of the SMCU 36, the system clock distribution unit (SCDU) 35 inputs a system clock from external and outputs the system clock to each of the units constructing the switching apparatus. A processor interface control unit (PICU) 38 interfaces the switching apparatus and a processor, and the reset control unit (RSCU) 39 initializes the switching apparatus.

Figure 4A:
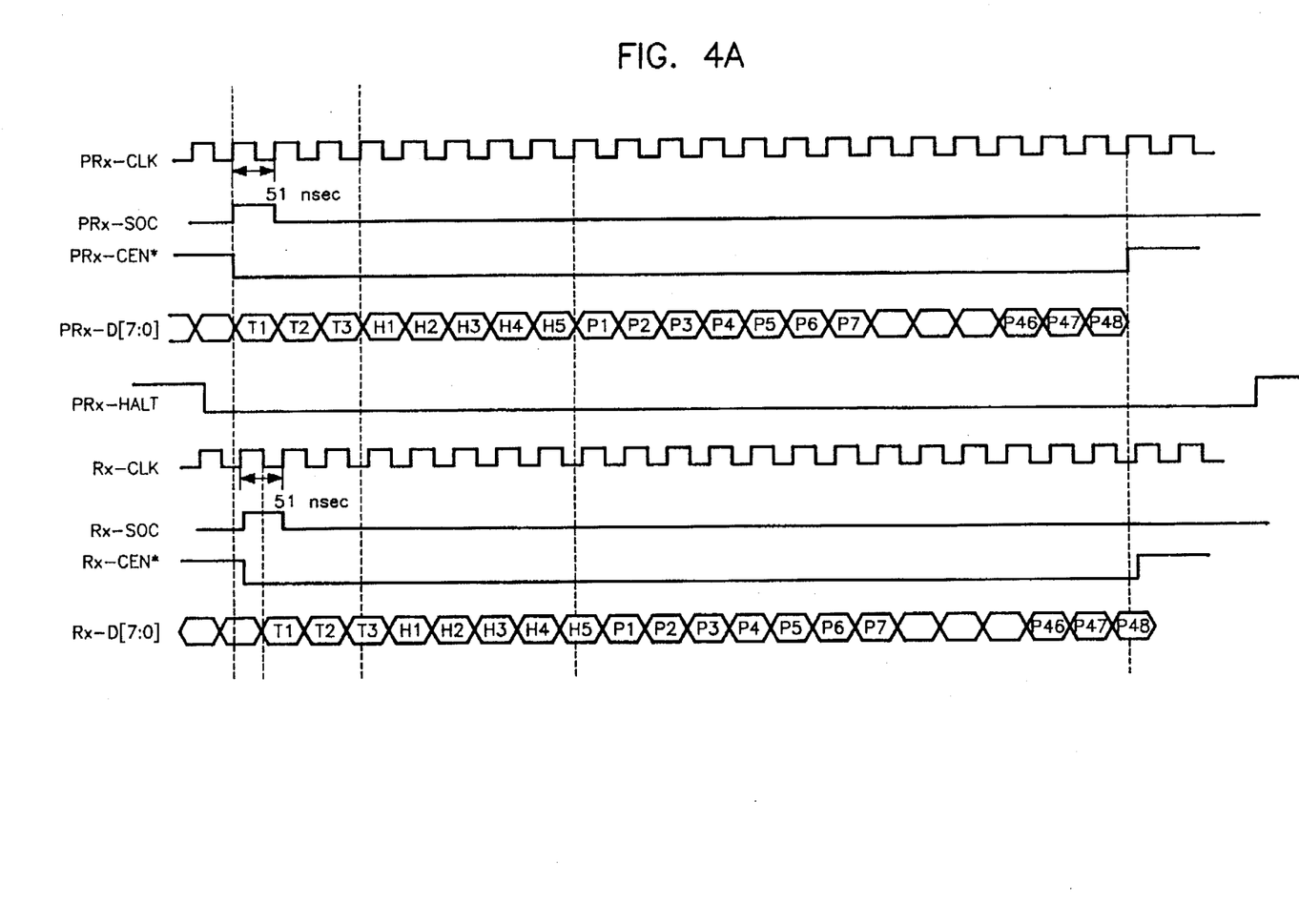
FIGS. 4A–4B is the timing view of an input/output data bus and control signals of FIG. 3.
Figure 4B:
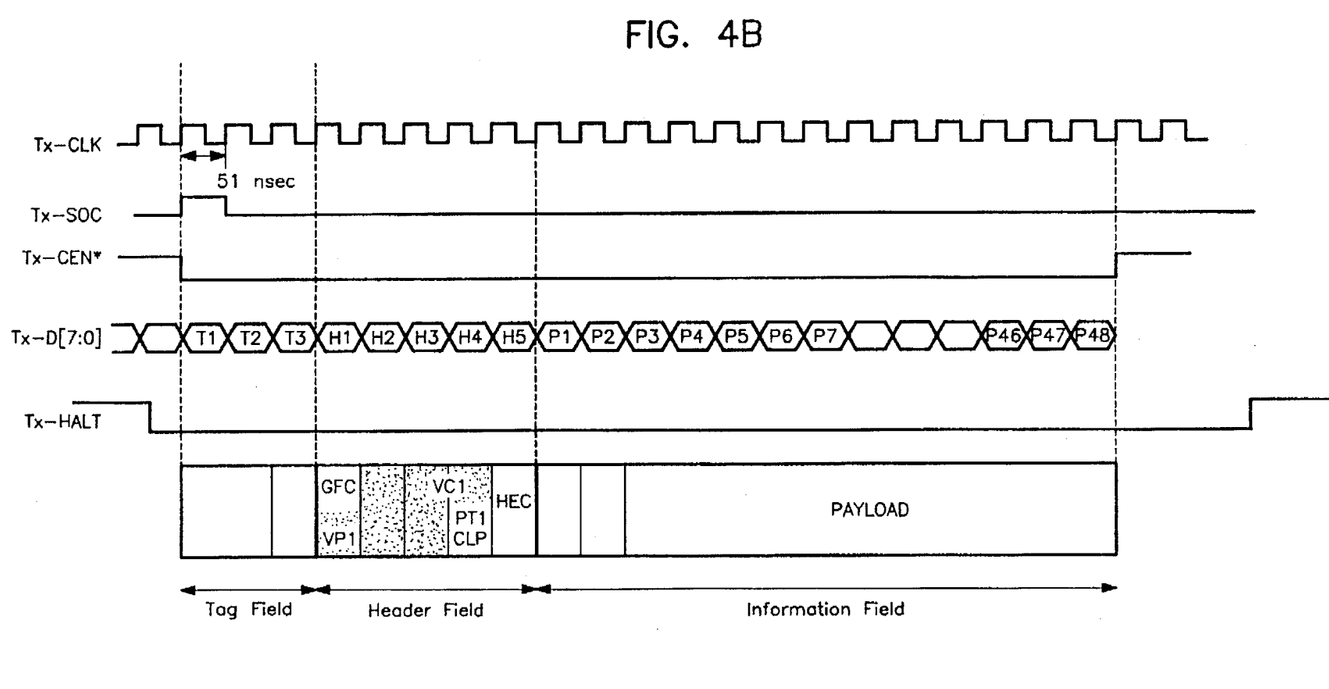

FIG. 4 is the timing view for an input/output data bus and control signals of FIG. 3. The first, second and third buses indicate an 8-bit data bus, a 3-bit up-direction control signal and a 1-bit down-direction flow control signal, respectively.

A fixed length packet, for example 56 octet packet, is inputted and outputted through the buses. The first and second buses follow a timing regulation, as shown in (A) of FIG. 4, and the third bus follows a timing regulation, as shown in (B) of FIG. 4. Only one port is shown, since the ports for the respective buses are all the same. -CLK is a byte clock for synchronizing packet data, -SOC is a signal indicating the start of the fixed length packet, -CEN is a up-direction control signal indicating the effectiveness of the packet and -HALT is the reverse direction flow control signal indicating the stop of the present transmission.

Figure 5:
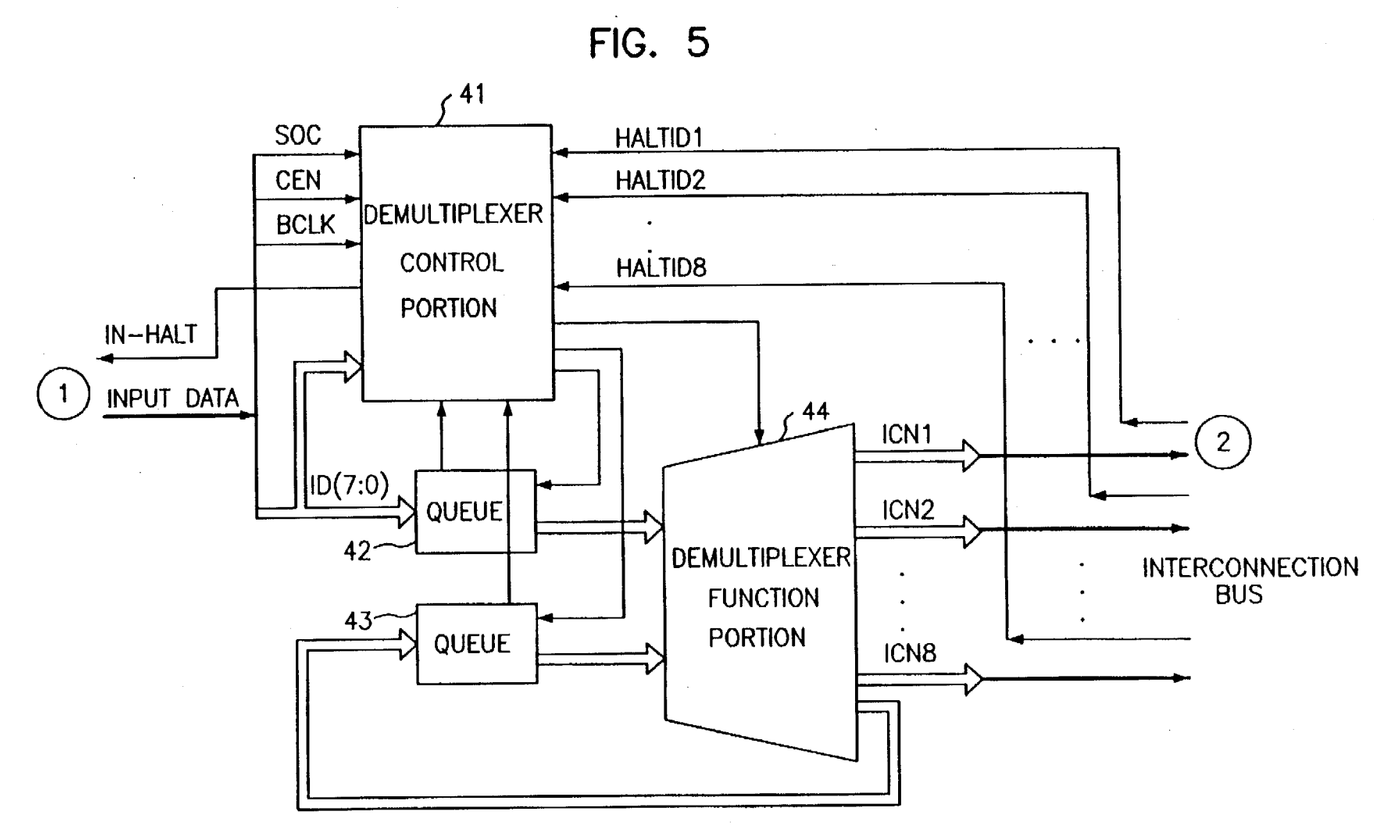
FIG. 5 is a view showing a detailed construction of a demultiplexer of FIG. 3.

FIG. 5 is a view showing the detailed construction of SIDU of FIG. 3. A demultiplexer control portion 41 inputs a fixed length packet through an input data bus from the IPDU 31, judges selection and non-selection of the inputted packet, stores input cells temporarily in a queue 42, and controls a demultiplexer function portion 44 for routing the cells to the respective SOMU 33, mutually and fully interconnected with the IPDU 31, corresponding to the point of a routing tag bit address "0" of the inputted cells. At this time, when a temporary overflow occurs in the internal buffer of the arbitrary SOMU 33, a packet transmission through the connection path is blocked, an identity signal HALTID$_x$, which is outputted from the SOMU 33 generating an overflow, is activated for securing a connection to the other connection path. According to this, transmitting bit addresses turn to "1" except for the routing tag bit address corresponding to the point of an overflow occurrence and the packet is than transmitted and again stored in a queue 43.

In the meantime, when transmission is available, the packet in the queue 43 is again transmitted. Accordingly, when a packet to be transmitted to the queue 43 is present, the packet has a higher transmission priority than the packet in the queue 42. Demultiplexers transmit all the points of the routing tag bit address "0" for enabling a packet duplicate function.

Figure 6:
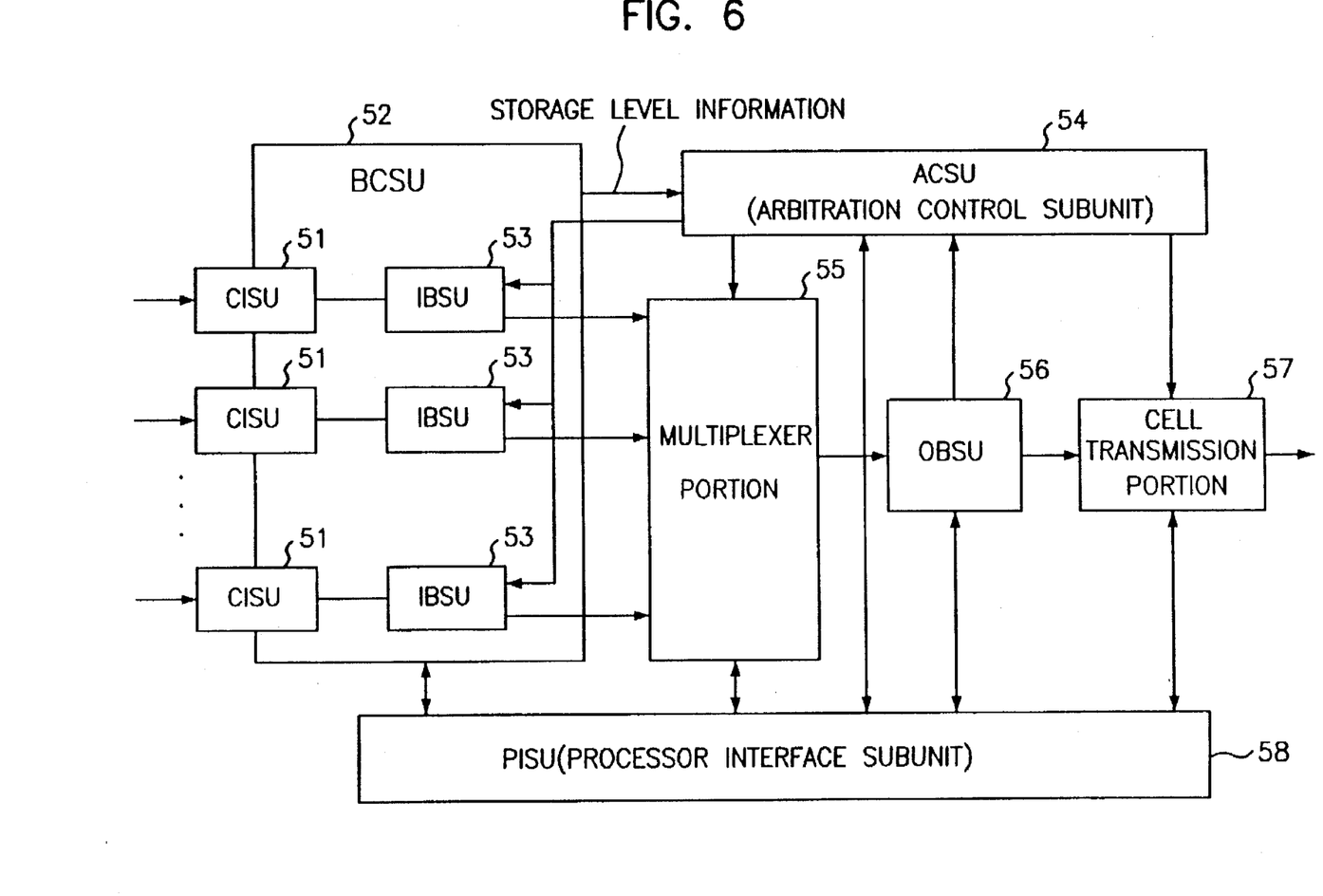
FIG. 6 is a view showing a detailed construction of a multiplexer of FIG. 3.

FIG. 6 is a view showing the detailed construction of the SOMU of FIG. 3. The SOMU 33 receive a packet from the SIDU 32 through an input link interconnected therewith, stores the packet in the IBSU 53 temporarily for a transmission standby and multiplexes cells according to the transmission rate of the output port. That is, SOMU 33 fully interconnected from the eight SIDU 32 perform a multiplexing function, a cell transmitting function after a temporary buffering for a rate matching of output ports and a gabage cell removing function. The cell input subunit (CISU) 51 stores a cell flow, which is received from the SIDU 32 according to the buffering control subunit (BCSU) 52, in the internal buffer subunit (IBSU) 53 which is an input buffer. The arbitration control subunit (ACSU) 54 inputs a level information of the cells, in which the cells are stored in the respective input buffer (IBSU) 53, from the BCSU 52, and controls a multiplexing function of the cells in the respective input buffer 53 by using the queue service system of the loaded input first output (LIFO). By the control, the multiplexer portion 55 reads out the cells in integer times of an input rate from the respective IBSU 53 for multiplexing the cells, and stores the multiplexed cells in the output buffer subunit 56 of an internal output buffer.

In the meantime, the cell transmission portion 57 reads out the cells temporarily stored in the OBSU 56 and outputs the cells in a rate matched with the external rate.

The CISU 51 has an independent construction to process a packet flow inputting in independent rate and phase and to perform an 8:1 multiplexing function by one of the SOMU 33.

The present invention described above can protect the entire operations as well as enhance the entire performance of the switching apparatus by preventing an obstacle of the switching apparatus, due to an overflow temporarily generated from an output terminal, process, without a loss of excessive cells, a traffic phenomenon of one output port in the switching apparatus, reduce the necessary buffer, according to the effect of a rate gain, and smoothly process the input traffic of the internal buffer having a burst characteristic. Further more, the present invention has a duplicate function of cells able to provide a broadcast-type service distributed to subscribers at one time so that the subscribers can receive a distributed service to thereby increase the effectiveness of a channel.

What is claimed is:

1. A switching apparatus including a plurality of line interface parts and a system management part, fixed length packet switching apparatus using multiplexers and demultiplexers comprising a switching part having:

a plurality of input port driving units (IPDU) for inputting a packet target point information signal (a routing tag), a connection identifier signal and a receiving clock signal in synchronization with a transmission frame inputted through the plurality of line interface parts, performing noise removal and buffering functions of the signals and performing a connection function between adjacent units;

a plurality of switch input demultiplexer units (SIDU) for inputting continued packets constituted with data corresponding to a packet flow and a packet flow-related control signal from the IPDU, judging the selecting or non-selecting of the packets, temporarily storing the packets, demultiplexing and duplicating the packets for routing the packet according to the target point information signal and performing a temporary store function of the packets when an overflow occurs on a specific input link;

a plurality of switching output multiplexer units (SOMU) for inputting and collecting in an output buffer each of the packets routed through the input links fully interconnected with the respective SIDU and multiplexing the collected packets for outputs as a packet flow;

a plurality of output port driving units (OPDU) for outputting the packet flow of the SOMU to each of the plurality of line interface parts;

a switch module control unit (SMCU) for controlling each of the SOMU, checking the state of the SOMU, and reporting the state of the SOMU to the management processor;

a switch change-over control unit (SCCU) for performing a change-over function to substitute an error occurrence switch according to the state reporting of the SMCU;

a system clock distribution unit (SCDU) for inputting a system clock from external and outputting the system clock to each of the units constructing the switching apparatus;

a processor interface control unit (PICU) for interfacing the switching apparatus and a processor; and a reset control unit (RSCU) for initializing the switching apparatus.

2. A switching apparatus as claimed in claim 1, wherein the SIDU includes:

a demultiplexer control portion which inputs a fixed length packet through an input data bus from the IPDU, judges selection and non-selection of the inputted packet and generating control signals for controlling the components of the SIDU;

a first queue for storing the inputted packet according to the controls of the demultiplexer control portion;

a demultiplexer function portion for demultiplexing a packet outputted from the first queue, according to the controls of the demultiplexer control portion, and for outputting the demultiplexed packet to the SOMU; and a second queue for storing a packet outputted from the demultiplexer function portion when a temporary overflow in an internal buffer of any of the SOMU occurs.

3. A switching apparatus as claimed in claim 1, wherein the SOMU includes:

a cell input subunit (CISU) for inputting a cell flow received from the SIDU according to a control of the buffering control subunit (BCSU);

an internal buffer subunit (IBSU) for storing the inputted cell flow from the CISU according to a control of the BCSU;

an arbitration control subunit (ACSU) for inputting a level information of cells stored in each of the IBSU and for controlling the multiplexing function of the cells in each of the IBSU by using a queue service system of the loaded input first output (LIFO);

a multiplexer portion for reading out cells in integer times of an input rate from each of the IBSU for multiplexing the cells;

an output buffer subunit (OBSU) for storing the multiplexed packet by the multiplexer portion; and a cell transmission portion for reading out cells temporarily stored in the OBSU and for outputting the cells in the rate matched with the external rate.

* * * * *